Nov. 12, 1929.     A. NYROP     1,735,692
CONTINUOUSLY OPERATING CENTRIFUGAL SLUDGE SEPARATOR
Filed Dec. 6, 1928     2 Sheets-Sheet 1
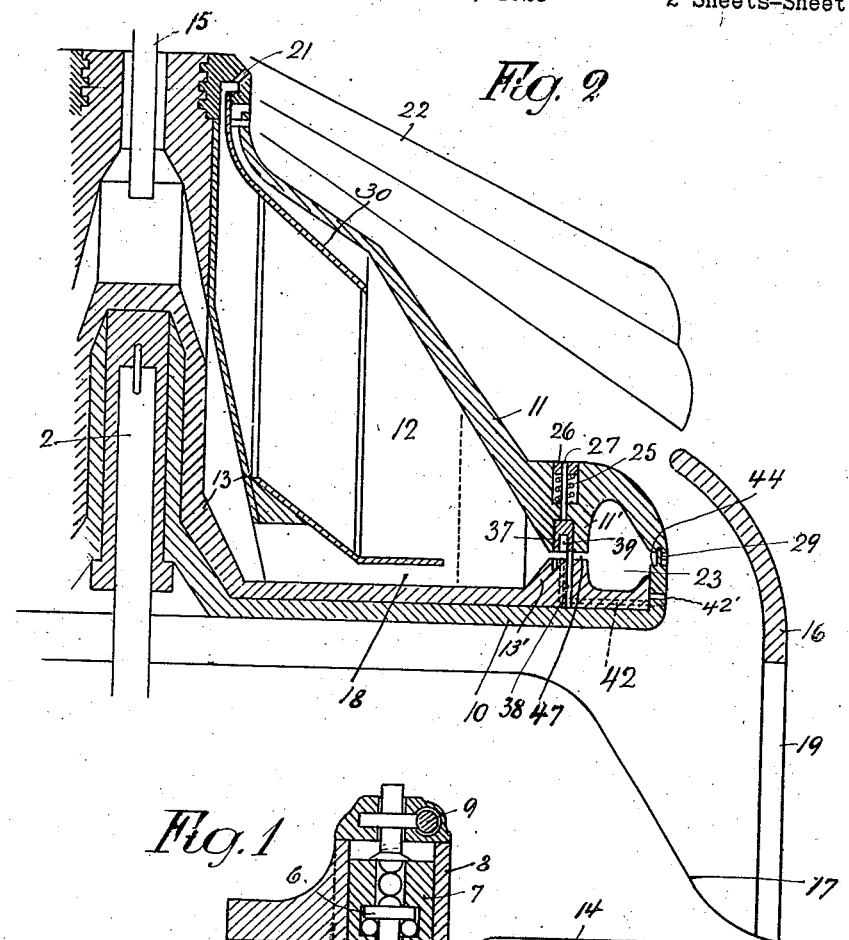
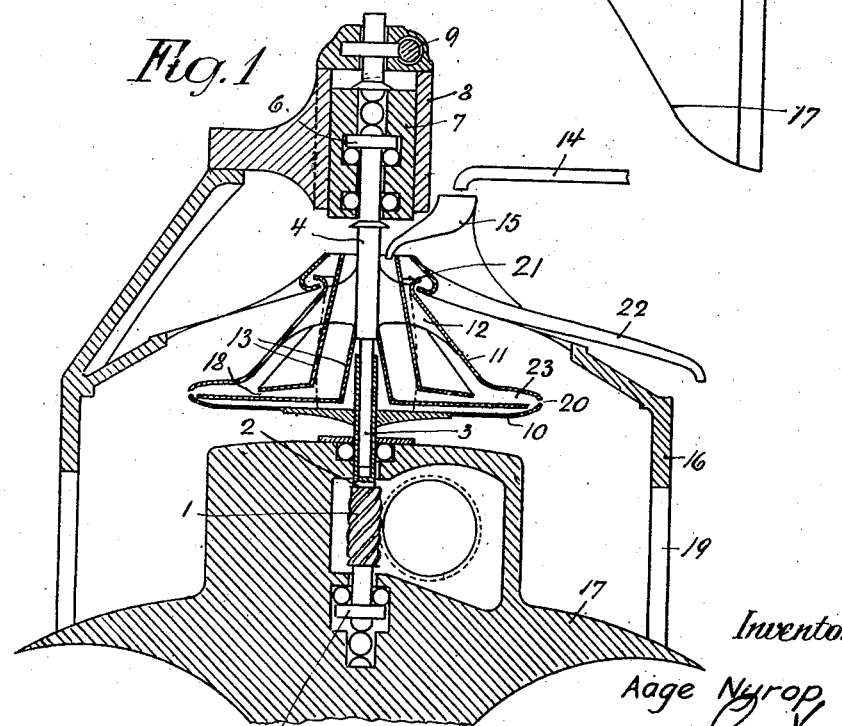
Inventor
Aage Nyrop
by [signature]
ATTORNEY

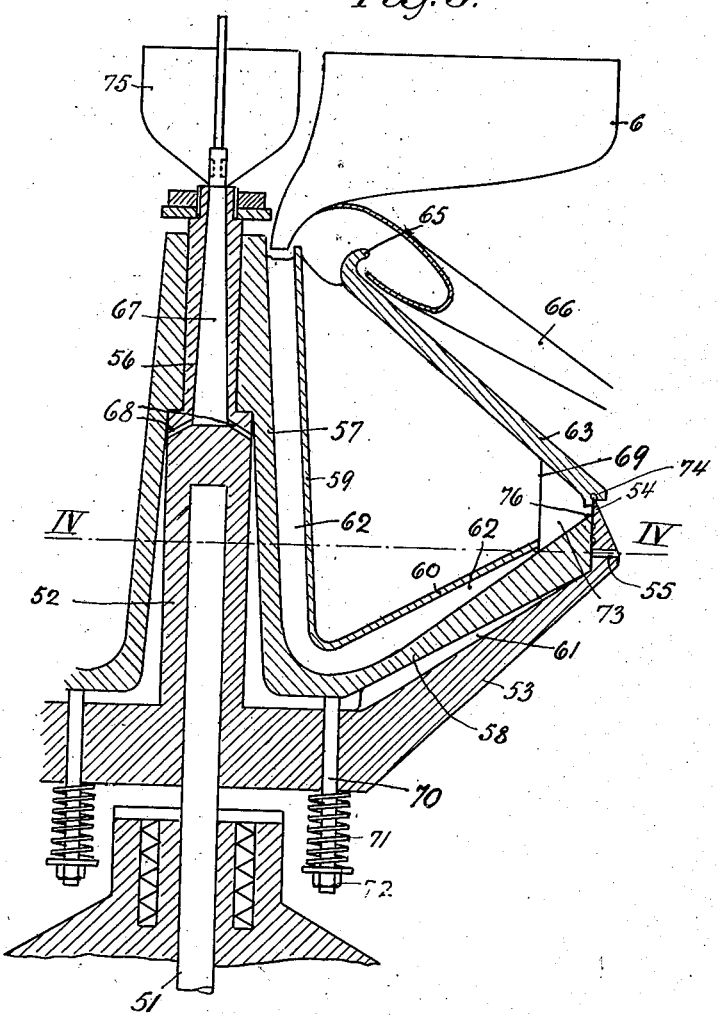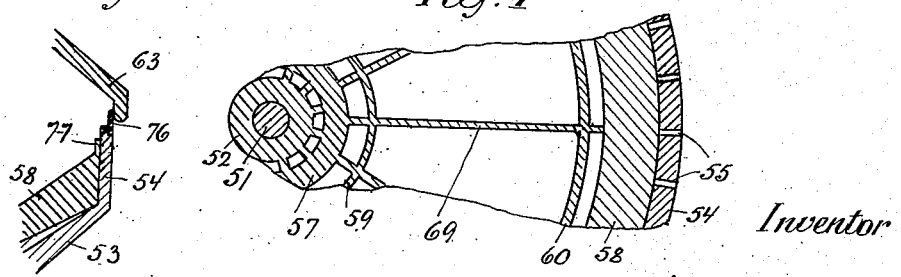

Patented Nov. 12, 1929

1,735,692

UNITED STATES PATENT OFFICE

AAGE NYROP, OF COPENHAGEN, DENMARK

CONTINUOUSLY-OPERATING CENTRIFUGAL SLUDGE SEPARATOR

Application filed December 6, 1928, Serial No. 324,241, and in Denmark December 6, 1927.

It is known that sludge may be separated by treatment in centrifugal machines, as it is done for instance in oil separators, where the sludge is left in the centrifugal drum from where it must be removed, when the machine is stopped. This method, however, cannot be employed where the quantities of sludge are very considerable, since too much time is used in taking the machine apart, in scraping off the sludge deposited and in assembling again the parts of the centrifugal separator. During the last decades it has therefore been attempted to produce continuously operating sludge centrifugals, that is to say centrifugal machines which during operation automatically discharge the sludge. By the treatment of some substances the problem has been solved by adding to the liquid some other liquid, which is heavier than the sludge, and on the surface of which the sludge is then removed, but this method cannot be used universally.

It has been proposed to let these sludge separators work continuously, a flow of water being directed intermittently through the centrifugal, whereby the sludge is squirted away, but the method can only rarely be applied, since in most cases the sludge is very coherent and cannot be squirted away. Finally it has been attempted to remove the sludge mechanically during the operation of the separator, and it has been attempted to remove the sludge by the provision of various outlets and valves, but up to the present time the construction of a really continuously operating machine has not been attained.

The present invention solves this problem for any fluid, and when the new centrifugal separator has been adjusted for one fluid it will be able to work indefinitely without having to be taken apart.

The principal feature of the invention is the removal during the operation of the so-called "undersludge", i. e. the sludge deposited farthest away from the central axis of the centrifugal machine, and consequently the heaviest and most concentrated sludge, so that the removal of the same may commence after the separator has been started, and the first bottom sludge has been formed. The discharge of sludge is governed automatically by the specific gravity of the sludge.

By such a continuously operating sludge separator the centrifugal drum consists of two parts adapted to be displaced relatively to one another. The present invention relates also to a device serving to facilitate the regulation of this displacement, which again will mean a finer regulation of the discharge of sludge.

The invention is shown on the drawing, where:

Fig. 1 shows a vertical section of one construction of the new centrifugal sludge separator.

Fig. 2 shows a vertical section of another construction.

Fig. 3 shows a vertical section of the preferred form of the invention with a device serving to facilitate the regulation of the displacement of the two parts of the centrifugal drum.

Fig. 4 is a horizontal section along the line IV—IV in Fig. 3, while

Fig. 5 shows a vertical longitudinal section of a somewhat modified construction.

In the construction shown in Fig. 1, 1 indicates a worm driving a shaft 2 which is extended upward in a shaft 4, the said two shafts being connected by a telescopic joint 3 in such a manner that they are firmly connected in the direction of rotation, but are free to move relatively to one another in longitudinal direction. By means of bearing 5 the shaft 2 is fixed in longitudinal direction to the bottom part 17 of the separator, and at 6 the shaft or shaft part 4 is fixed longitudinally to a member 7 which by means of an adjusting screw 9 may be moved vertically in a sleeve 8.

To the shaft 2 a lower cup 10 is attached and to the shaft 4 is attached by means of radial members 12 a conical cover 11 and an interior double funnel 13 serving partly to take up the vertical pressure and partly to guide the liquid from a pipe 14 by way of a supply pipe 15, into the annular slot 18 formed by the walls of the double funnel 13.

Outside of the rotary parts a mantle 16 with openings 19 is provided. The mantle 16 is rigidly connected to the base member 17 and between the interior funnel 13 and the conical cover 11 a slot 20 closed by said lower cup 10 is formed which may be of any suitable shape, for instance circular or broken, all depending on the nature of the sludge, and by moving the cup 10 downwards the slot may be opened.

The described centrifugal separator acts in the following manner:

The liquid supplied which is directed through the slot 18 will fill the separator up to the dotted line, and will flow out at the top at the upper edge 21 of the cover 11 and be discharged by way of an outlet 22. The heavier parts of the fluid concerned will be deposited within the periphery of the cover 11 and interior double body 13 at the place marked 23, and will gradually occupy the position shown by dotted line, whereafter the raw fluid, as explained above, will flow over the edge 21.

If now the sludge itself were fluid, it would be possible to proceed as in an ordinary centrifugal separator and to direct the sludge back and out, but this is impracticable in the present case, since the sludge is not fluid. By the present invention, on the other hand, the sludge is discharged by means of centrifugal force, because when the separator is well filled with the sludge the shaft 4 is moved upward by means of the described screw device 9, whereby an opening is formed at the slot 20. The opening is then adjusted in such a manner that no more sludge is discharged than the quantity continuously separated, so that the bottom sludge is removed continuously.

It is easy to see that the cover 11 cannot be lifted until a sufficient quantity of sludge has been deposited inside of the joint 20, because if this joint were open at the start of the separator, then the entire fluid concerned would be flung out through this slot, since the material when supplied is quite fluid. The sludge discharged by way of the slot 20 is shoveled out by way of the openings 19.

The manipulations required according to the nature of the invention may of course also be performed in other manner than as here outlined. For instance the power required to open the slot 20 might be transmitted by way of the shaft 2, and the motion may be effected automatically by means of a simple lever device or the like. Where the fluids treated contain sludge particles of very different order of sizes the slot 20 may be increased automatically during certain periods, so that very large particles, i. e. particles which are larger than the width of the normal slot and which otherwise might obstruct the slot, may escape. It will also be feasible, after the discharge slot for the bottom sludge has been adjusted, to cause this adjustment to be dependent on a spring pressure, so that when the quantity of sludge in the separator is increased, the pressure of the sludge will be increased and the slot 20 may be more or less opened, while the said slot will be more or less closed when the quantity of sludge is reduced.

In the construction shown in Fig. 2, 2 indicates the shaft with sleeve on which the centrifugal drum is suspended. 10 indicates the lower cup, or bottom part which is in firm connection with the shaft 2.

By means of a telescopic joint the part consisting of a double body 13 and a conical cover 11 is connected to the bottom part 10, the members 13 and 11 being interconnected by a radial member 12 and a nut 33, and the connection between the bottom part 10 and the top part consisting of the members 13 and 11 being interconnected in such a manner that they will be firmly connected in the direction of rotation, but may be mutually displaced in axial direction. The double body 13 serves to direct the liquid, which enters by way of the supply pipe 15, out into the centrifugal drum by way of the annular slot 18.

Likewise as in the construction shown in Fig. 1 there is here provided on the outside of the rotary parts, a mantle 16 with openings 19, and the mantle 16 is in firm connection with the base member 17. Between the bottom piece 10 and the conical cover 11 there is provided a narrow passage 20, which may be of any suitable shape, and by pushing the upper parts 11—13 down on to the disk 10 the passage or slot 20 may be closed entirely.

On the conical cover 11 there is provided, inside of the elastic closing member 29, a pressure surface 44, the shape and width of which may be varied according to the liquids supplied. The interior double body 13 is provided with a raised annular ring 13' and the cover 11 is provided with a depending annular ring 11'. These annular rings are so placed on their respective members so that they are adjacent each other and form a sludge chamber 23 around the periphery of the rotating drum. Inside of the sludge chamber 23 there may be provided an inner peripheral slot 47 between the conical cover 11 and the bottom part of the double body 13, bolts 38, 27 with nuts 26 and springs 25 being provided for the purpose of pressing the cover 11 against the bottom piece 10.

This centrifugal separator acts in the following manner:

The liquid supplied, which is directed through the slot 18, will fill the centrifugal separator until the liquid flows out at top, at the outlet marked 21, and is collected in known manner in collecting disks 22. The heavier parts of the fluid will be collected as closely inside of the periphery of the drum as possible, at the place marked 23.

If now the sludge itself were fluid the procedure might be the same as in case of an ordinary centrifugal separator, and the sludge might be directed backward and out, but as mentioned above this is not practicable unless the sludge be fluid. Here too the sludge is discharged by means of centrifugal force, since the centrifugal drum when suitably filled with sludge, owing to the increased inner weight, will open the slot 20 during the operation, while the bottom piece 10 and the conical cover 11 and members 12, 30 and 13 will move away from each other.

Before the separator is started the liquid to be separated has been closely examined and its specific gravity has been determined, and in accordance thereto the pressure is adjusted by means of the springs 25 relatively to the size of the pressure surface 44, in such a manner, that the pressure on this surface will be equal to the pressure of the springs when the drum is filled with liquid and the sludge has been deposited up to, for instance, the line A. When now more sludge is deposited in the drum, then the pressure against the member 44 will exceed the spring pressure, and the top and bottom piece of the drum will move away from one another. If now a closing ring or closing devices 37 have been provided between the parts 11 and 13 in connection with the bolts 27, then this ring or these devices will move downward relatively to the member 13 and stop any further supply to the sludge chamber 23. If now simultaneously, for instance by means of an outlet 42, while the devices 37 close the slot 47, an outlet is opened for the fluid enclosed below the device 37 in the cavity 39, so that the said fluid may freely escape by way of the pipe 42, then the force which previously acted upward against the device 37 will be released. The separating forces acting on the interior of parts 11 and 13 will be further increased, since there is now no outlet for the sludge and the slot 20 will be fully opened against the action of springs 25.

By proper calculation of the curve of outflow of the sludge through the slot 20 then the drum, notwithstanding the pressure given for instance by the springs 25, will not be able to close itself until all the sludge has been discharged by way of the slot 20. When no more sludge is left in the sludge chamber 23 the drum will close itself, and the pressure, given for instance by the springs 25 will predominate, and when the fluid enters below the device 37 said separating forces will at once be decreased considerably thereby.

In the preferred construction shown in Figs. 3 to 5, 51 is the vertical shaft supporting the centrifugal separator. The shaft is fitted with a hub 52 supporting a lower cup 53 with upturned periphery 54 which is fitted with a series of channels or discharge outlets 55. The hub 52 is fitted at top with a tubular extension 56. In said lower cup 53 there is inserted an interior double body consisting of a cylindrical or conical hub 57 encircling the hub 52 and the tubular extension 56, the said hub 57 being fitted with an inner cup 58 adapted to slide tightly against the inner face of the vertical edge 54 of the lower cup 53, so that the edge 54 of the lower cup 53 co-operates with the edge 76 of the inner cup 58 like a piston with its cylinder. Above the inner cup 58 there is provided, coaxially to the hub 57 an upper member 59 with a cup 60 attached thereto. Hereby there is formed a chamber 61 between the lower cup 53 and the inner cup 58, and between the hubs 57 and 59 and said inner cup 58 and said upper cup 60 another chamber 62. Co-operating with the upper end of the bent edge 54 of the lower cup 53 there is provided a conical cover 63 which is connected to the hub 57 and the member 59.

The liquid to be separated is directed from a tank 64 to the annular chamber 62 between the hub 57 and the member 59, and the separated liquid flows along the inner edge of the conical cover 63 and over the edge 65 to a discharge pipe 66. The inner channel 67 of the tubular hub 56 communicates by way of a couple of small bores 68 with the chamber 61 between the lower cup 53 and the inner cup 58. Vertical wings or vanes 69 may be provided in the chamber formed between the inner cup 58 and said cover 63. The inner cup 58 is fitted with some bolts 70 passing through the lower cup 53, and thereby the said inner cup 58 may be pressed firmly against the lower cup 53 by means of springs 71 and nuts 72.

The device acts in the following manner: Until sludge has been collected at the place marked 73 the parts will be in the position shown on the drawing, whereby the slot 74 between the top part of the vertical edge 54 and the bottom part of the cover 63 is closed, but when sufficient sludge has been collected a liquid is introduced, from a tank 75 disposed above the channel 67, into the channel 67 from where the liquid passes through the small holes 68 into the chamber 61, and by the peripheral pressure of the liquid the inset 58, 60, 63 will be forced upward in such a manner that a slot 74 will be formed between the edge 54 and the cover 63 by way of which slot the sludge collected in the space 73 will gradually be discharged. When the inset is lifted sufficiently to uncover the holes 55 in the edge 54, then the liquid contained in the chamber 61 will escape by way of these holes and cause the inset to sink again, so that the slot 74 will be closed. By suitable supply of liquid from the tank 75 the inset 58, 60, 63 may be maintained lifted so far that the slot 74 will be sufficiently wide to allow a uniform and suitable discharge of sludge.

In order to secure tightness between the edge 54 and the cover 63, as well as between the inner cup 58 and the edge 54, the upper part of the edge 54 may for instance consist of thin and somewhat resilient rings 76, and in the same manner the top edge of the inner cup 58 may be fitted with a thin resilient packing ring 77 (see Figure 5). The cover 63 should then be fitted with a bent edge somewhat conical on the inside as shown on the drawing (see Figure 5). It ought to be mentioned that besides the vertical partition walls 69 the centrifugal separator may of course in known manner be arranged to hold the cups in such a manner that the contents may be separated in layers.

Finally it should be added that there may be provided an overflow pipe from the interior of the separator to the tank 75, in such a manner that the liquid directed to the separator will be directed up to the tank 75 and cause the inset to be lifted when the separator is filled with sludge.

In the foregoing the cover 63 has been assumed to be maintained pressed against the lower cup by means of springs 71, the number size and tension of which may be adjusted according to circumstances.

In the case of certain liquids, however, this manner of depressing the cover may possibly be insufficient, and liquid pressure may then be used on top of said cover 63, either instead of the spring pressure or together with the latter.

Having now described my invention, what I claim as new and desire to secure by Latters Patent is:

1. A centrifugal sludge separator having a rotating unit with relatively displaceable elements comprising a lower cup having an upturned periphery provided with discharge outlets normally closed, a conical cover slidably and coaxially mounted with respect to said lower cup and normally abutting said upturned periphery, said discharge outlets being opened upon a predetermined displacement of said conical cover and resilient means cooperating with said plurality of discharge outlets to return said conical cover to normally abutting position after said predetermined displacement.

2. A centrifugal sludge separator having a rotating unit with relatively displaceable elements comprising a lower cup having an upturned periphery provided with discharge outlets, an interior double body slidable and coaxially mounted with respect to said lower cup and normally closing said discharge outlets, a conical cover integral with said interior double body and normally abutting said upturned periphery, said interior double body and said conical cover being capable of displacement to form a peripheral discharge slot and to open said discharge outlets and resilient means acting between said interior double body and said lower cup and in conjunction with said discharge slots to return said cover to abutting relation with respect to said lower cup.

3. A centrifugal sludge separator having a rotating unit with relatively displaceable elements comprising a lower cup having an upturned periphery, an interior double body slidably and coaxially mounted with respect to said lower cup and forming a chamber therewith, a conical cover integral with said interior double body and normally abutting said upturned periphery, resilient means acting to maintain said conical cover and said lower cup in normally abutting position and displacement control means communicating with said chamber.

4. A centrifugal sludge separator having a rotating unit with relatively displaceable elements comprising a lower cup having an upturned periphery, an interior double body slidably and coaxially mounted with respect to said lower cup and forming a chamber therewith, a conical cover integral with said interior double body and normally abutting said upturned periphery, resilient means acting to maintain said conical cover and said lower cup in normally abutting position and displacement control means comprising a tank, a channel and small holes provided within said lower cup communicating with said chamber.

5. A centrifugal sludge separator having a rotating unit with relatively displaceable elements comprising a lower cup having an upturned periphery provided with discharge outlets, an interior double body slidably and coaxially mounted with respect to said lower cup and normally closing said discharge outlets, a conical cover integral with said interior double body and normally abutting said upturned periphery, an annular elastic closing member mounted on the upper edge of said upturned periphery, said interior double body and said conical cover being capable of displacement to form a peripheral discharge slot and to open said discharge outlets and resilient means acting between said interior double body and said lower cup and in conjunction with said discharge slots to return said cover to abutting relation with respect to said lower cup.

In testimony whereof I affix my signature.

AAGE NYROP.